United States Patent [19]
Laukien

[11] 3,774,103
[45] Nov. 20, 1973

[54] METHOD OF RECORDING SPIN RESONANCE SPECTRA AND A SPIN RESONANCE SPECTROMETER SUITED FOR THE PURPOSE

[76] Inventor: Gunther Rudi Laukien, Silberstreifen, 7501 Forchheim, Germany

[22] Filed: July 21, 1971

[21] Appl. No.: 164,701

[30] Foreign Application Priority Data
Dec. 11, 1970 Germany................ P 20 61 018.8

[52] U.S. Cl............................................ 324/0.5 R
[51] Int. Cl. ........................................ G01n 27/78
[58] Field of Search................ 324/0.5 R, 0.5 A, 324/0.5 AC, 0.5 H

[56] References Cited
UNITED STATES PATENTS
| | | | |
|---|---|---|---|
| 3,052,834 | 9/1962 | Schuster | 324/0.5 |
| 3,287,629 | 11/1966 | Varian | 324/0.5 |
| 3,475,680 | 10/1969 | Anderson | 324/0.5 |

*Primary Examiner*—Michael J. Lynch
*Attorney*—Craig, Antonelli & Hill

[57] ABSTRACT

In recording spin resonance spectra, when the sample is excited by an RF-pulse in a homogeneous magnetic field for measurement and then all resonance frequencies of the sample are registered as an interferogram and evaluated, a pulse-excited magnetic field for measurement is used according to the invention. In this way, higher field strengths can be achieved for the magnetic field of measurement than has been possible before. These higher field strengths permit improved resolution of the fine structure of macromolecules. A spin resonance spectrometer suited for this method has an air-core coil for generation of the excited magnetic field and an energy source connected with the air-core coil which comprises devices for keeping constant the current flow in the coil for the duration of the respective pulse.

16 Claims, 5 Drawing Figures

METHOD OF RECORDING SPIN RESONANCE SPECTRA AND A SPIN RESONANCE SPECTROMETER SUITED FOR THE PURPOSE

The present invention relates to a method of recording spin resonance spectra, specifically nuclear spin resonance spectra, in which a sample is brought into a magnetic field of measurement at least approximately homogeneous, which sample is subsequently excited by an RF-pulse, then all resonance frequencies of the sample are simultaneously registered as an interferogram and, finally, the interferogram is subjected to a Fourier analysis.

Simultaneous excitation of all resonance frequencies of a sample by means of an RF-pulse, especially of a 90° pulse, registration of these resonance frequencies as an interference signal which is then subjected to a Fourier analysis, offers the advantage, relative to the other familiar method in which the resonance frequencies contained in the sample substance under investigation are consecutively excited with an RF-field with variable frequency and recoreded, that the measurement time required for recording of the spectrum is reduced considerably relative to the classical method of spectroscopy.

It is known also that it is advisable for many measurement problems in spectrometry to have the highest possible magneic fields available for measurement. The reason is that the atomic nuclei to be measured are surrounded by electron shells of different densities in atoms and molecules which attenuate the external magnetic field in respective varying degrees. As a consequence, resonance lines of the same nuclear species are obrained in the measurement of nuclear magnetic spectra which are displaced in varying extents, and the frequency separations due to this displacement are the larger the stronger the externally applied magnetic field of measurement. This displacement is known also as the chemical shift.

Moreover, the electron shell has another effect besides the diamagnetic effect described above, i.e., a paramagnetic effect if its electron spins are not completely saturated in pairs, which causes differential amplification of the external magnetic field of measurement at the different places of nuclei. Although this paramagnetic effect of the electron shell does not yet play a major role in high resolution nuclear resonance spectrometry, because this nuclear spin resonance spectrometry still deals with almost pure diamagnetic substances, this paramagnetic effect may gain in significance in the future and it applies also to this aspect that the line separation due to the paramagnetic effect increases in proportion with the size of the external magnetic field of measurement.

Especially in the investigation of macromolecules of the kind occurring in high polymer technology and in biomedical research the spectroscopist faces the problem that there are a great many resonance lines, which are shifted diamagnetically or paramagnetically by a relatively small extent, which are caused by the fact that there is always a different magnetic field at the places of the numerous nuclei contained in such macromolecule which is due to the superposition of the external magnetic field of measurement with internal magnetic fields of the specimen or to the shielding by electron shells.

Hence, over the past few years, technology has been trying to design ferromagnets for spin resonance spectrometry with a magnetic field of the highest possible field strength. However, the field strength of the magnetic field that can be attained with a ferromagnet is limited mainly by the saturation magnetization of iron. An increase in field strength thus was possible only with ironless magnets, i.e., by means of air-core coils. Therefore, the application of magnets consisting of superconducting air-core coils, also called cryomagnets, was introduced into nuclear resonance spectrometry. Such air-core coils made of superconducting material can generate fields of high homogeneity and a field strength up to some 50 kG, while the maximum field strength of ferrous magnets is limited to the order of 25 kG. However, considerably higher field strengths cannot be generated in this way at the present state of the art and thus cannot be applied in nuclear resonance spectrometry.

Permanently connected magnetic fields, which have been used so far exclusively in spin resonance spectrometry, cannot be made to higher field strengths at a reasonable expenditure with the means known in the art. While an ironless magnet is known whose field strength may be up to 200 kG, such a magnet requires such a high expenditure with respect to the supply unit, which must have a high power output and must be capable of supplying very high currents, and with respect to the removal of Joule's heat generated in the magnets, so that such magnet must presently be outruled for spin resonance spectrometry.

Finally, in another known method, mangets formed by air-core coils are supplied very strong current pulses in such a way that pulse-shaped magnetic fields with a duration of, for instance, 10 msec are generated. In this way, field strengths up to 500 kG can be produced. This type of pulse shaping of a magnetic field requires extremely high currents also for the generation of the magnetic field, but the average capacity of a supply unit provided for this purpose remains low and, accordingly, also Joule's heat generated in the coil remains within manageable limits. However, these pulsed magnetic fields are only experiments to investigate the possibility of generating such mangetic fields, and in none of these experiments has the applicability of pulsed magnetic fields in spin resonance spectrometry ever been considered. Up to now, such magnets have been employed merely for measurements on magnetic materials, if at all. Besides, there are many other fields of application requiring very high magnetic fields. From the explanations above it is evident that the use of the strongest possible magnetic fields should be sought in spin resonance spectrometry if the fine structure of nuclear spin resonances of macromolecules is to be investigated. The attempts of creating magnets suitable for nuclear spin resonance spectrometry have terminated in cryomagnets which can generate a field strentth up to some 75 kG. Stronger mangetic fields have not yet been applied becuase of the large expenditure involved in their generation. The experiments in achieving higher field strengths by pulsing the magnetic field have not yet been applied to spin resonance spectrometry. Hence, the maximum field strength so far applied in practical spin resonance spectrometry is around some 75 kG.

By contrast, the present invention is based on the problem of developing a simple possibility for the application of magnetic fields of measurement with higher field strengths and in this way extend the possibilities existing with respect to investigations of the fine structure of nuclear spin resonance spectra on macromolecules.

This problem is solved in a surprisingly simple way in that a magnetic field of measurement excited to the shape of a pulse is employed in the method mentioned earlier in this specification of recording spin resonancce spectra in which all the resonance frequencies of the sample are simultaneously excited by an RF-pulse, recoreded afterwards as an interference signal and then determined by a Fourier analysis of the interference signal.

Accordingly, the present invention consists of a combination of recording of the spectrum as an interference signal and subsequent evaluation of this interference signal by means of Fourier analysis in connection with the application of a magnetic field of measurement excited to the shape of a pulse, because only in the application of this method of measurement is it possible also to apply a pulsed magnetic field since in the classical method of spectroscopy, in which the sample is subjected to a varying RF-field for scanning of the resonance frequencies it contains, the sample must be in a constant external magnetic field over the entire scanning period. However, scanning of the sample requires a relatively long scanning period extending over many minutes so that also pulse shaping of the magnetic field is no feasible method. Hence, all the spin resonance spectrometers known to date are equipped with devices for the generation of a permanent or continuous magnetic field, and the idea of applying a pulsed magnetic field was completely alien to the spectroscopists' minds.

The idea of applying a pulsed magnetic field was not obvious also for the reason that in previous experiments with pulsed magnets the duration of the magnetic field was of the order of 10 msec, which time was too short even for spectroscopy including recording and evaluation of interference signals. In a duration of the magnetic field of 1/100 sec, the resolution of the spectrum is limited to 100 Hz and thus insufficient in the light of the usual requirements made of high-resolution nuclear resonance spectrometry, becuase here the aim is a resolution of 1 Hz. Also for this reason no spectroscopist so far has ever thought of working with pulsed magnetic fields, but has only developed devices which supplied continuous magnetic fields of the highest possible constance.

However, this is a prejudice insofar as it assumes that only continuous magnetic fields are applicable in spin resonance spectrometry, for, on the one hand, it is quite easy to extend the duration of the magnetic field pulse to 1/10 or even 1 sec without encountering the difficulties which are in the way of the generation of continuous magnetic fields and, on the other hand, the resolution of 1 Hz normally sought is not required, in particular with macromolecules for whose investigation these particularly strong magnetic fields are required, because the natural line widths are larger, sometimes even much larger, than 1 Hz. So, there is no reason for aiming at a resolution better than 10 Hz, which makes measurement times of 1/10 sec and a corresponding duration of the magnetic field pulse completely sufficient. It is of much greater importance to note that in the application of high fields of measurement the chemical shifts can be increased by a factor on the order of 10, which allows for better separation of the broad lines.

Another prejudice which has so far prevented the experts from devoting their attention to the question of whether pulsed magnetic fields could be applicable to the use in spin resonance spectrometry is the requirement of a continuous magnetic field for polarization of the sample. In fact, it is necessary to polarize the substance under investigation before conducting nuclear magnetic measurements. However, nuclear magnetic polarization is built up only gradually after a magnetic field has been turned on, i.e., with the nuclear magnetic relaxation time characteristic of it. Accordingly, the pulsed magnetic field should exist always over a period of time which is at least equal to the sum of this relaxation period and the required time of measurement.

If it appears to be inadvisable to apply magnetic field pulses in accordance with duration, it is possible, in another embodiment of the invention, to expose the sample to a continuous magnetic field of polarization of low field strength in the invervals between the pulses of the magnetic field of measurement.

The fact is that it is not necessary for polarization of the sample to apply a magnetic field of an equally high strength as in spectrum recording; rather the strength of the permanent magnetic fields applied so far is quite sufficient to polarize the sample in a way sufficient for purposes of measurement. In the intervals of the measurement there is sufficient time for polarization of the sample; so, the complete period in which the pulsed magnetic field exists is available as measurement time.

In polarization of the sample by means of a continuous magnetic field of polarization it is possible either to fransfer the sample from the area of the continuous magnetic field of polarization into the area of the pulsed magnetic field of measurement, or to expose the sample in the same place alternately to the continuous magnetic field of polarization and the pulsed magnetic field or measurement which generate the magnetic field of measurement by superposition of the magnetic field of polarization with a pulsed magnetic field acting in the same direction.

Although it is known in principle how to separate the magnetic field of polarization from the magnetic field of measurement, this measure so far has been applied exclusively whenever the field of measurement was too small to cause sufficient nuclear magnetic polarization of the sample. Since both the magnetic field of polarization and the magnetic field of measurement are continous magnetic fields, the sample had to be transferred from one magnetic field into the other.

The use of an additional magnetic field of polarization also offers the possibility, in another embodiment of the present invention, to excite the sample by the RF-pulse immediately before the excited magnetic field is turned on so that no pulse time is lost for this excitation either. Yet, the resonance frequencies are available with the maximum possible amplitude the moment the excited magnetic field exists.

In another embodiment of the method according to the invention the interference signal recorded is transformed into a lower frequency range by superposition with a reference frequency prior to execution of the Fourier analysis and the magnitude of this reference frequency is controlled as a function of the instantaneous field strength of the magnetic field of measurement. As mentioned above, it has hitherto been the objective of the experts working on spin resonance spectrometry to create a magnetic field of measurement of extreme homogeneity and optimum time constance. The constance of the magnetic field was carried to an order of $10^{-9}$. It will certainly be difficult to achieve a similar constance of the field strength of the magnetic field of measurement also when this magnetic field of measurement is excited, for it would imply that the ripple and tilt of the pulse would have to be smaller than $10^{-9}$. This is another reason why average experts never spent a second thought on the possibility of applying an excited magnetic field of measurement. However, it is easily possible, by control of the current pulse flowing through the air-core coil which serves for generation of the magnetic field, to achieve a constance of the pulsed magnetic field of roughly $10^{-3}$ in a section which can be used as the measurement interval. This value is fully sufficient to balance out the variations of the resonance frequencies contained in the interference signal caused by the variations of the strength of the magnetic field, if there is a reference frequency controlled as a function of the strength of the magnetic field. The reference frequency may easily be controlled as a function of the field strength of the magnetic field of measurement, in the way known from the stabilization of magnetic fields, as a function of the resonance frequency of standard samples which are exposed to the magnetic field of measurement.

The present invention also relates to a spin resonance spectrometer, specifically a nuclear spin resonance spectrometer, which is suited for execution of the method according to the invention. Such spin resonance spectrometer conventionally comprises a device for the generation of a magnetic field at least approximately homogeneous, a device for the introduction of samples into this magnetic field of measurement, a device for excitation of the samples by means of a pulsed RF-field, a device for scanning the spin resonances excited in the sample, and a device for registration and evaluation of the resonance frequencies determined by scanning. According to the invention, such spin resonance spectrometer has an air-core coil for generation of an excited pulsed magnetic field, which coil is connected to a source of energy supplying current pulses of a high current intensity. In a preferred embodiment, the source of energy may be subdivided into several partial sources which can be sequentially connected and disconnectd and whose size and times of connection and disconnection, respectively, are chosen such that the current flow in the coil and hence the magnetic field generated by the coil are constant at least approximately over a considerable part of the time of duration of the pulse. Such source of energy may be made up, in particular, of a capacitor bank whose capacitors may be charged to different voltages. Moreover, the source of energy may contain impedances for control of the current flow which may be alternately connected or disconnected and control stages equipped with tubes and/or transistors for control of the current intensity. In addition, it is possible in this case to provide a control device which responds to the field strength of the pulsed magnetic field and which causes the partial sources and/or the impedances to be connected and disconnected, respectively, and/or supplies control signals to the control stages. These measures adopted either singly or in combination allow a constance of the magnetic field of $10^{-3}$ to be achieved at least for a considerable part of the duration of the pulse.

For superposition of the pulsed magnetic field with a magnetic field of polarization it is sufficient, in another embodiment of the present invention, to arrange the air-core coil serving for generation of the pulsed magnetic field in the gap of a ferromagnet or in the magnetic field of a cryomagnet.

Moreover, the device for registration and evaluation of the resonance frequencies may comprise a generator for a reference frequency which is controlled by a resonance frequency of a standard sample contained in the magnetic field of measurement in such a way that the reference frequency is in a certain ratio to the resonance frequency of the standard sample, and a superposition device, especially a phase detector, in which the resonance frequencies recorded are superimposed the reference frequency for transformation into a low frequency range.

Further details and variations of the present invention can be seen from the description below in which the invention is described in greater detail and explained on the basis of the embodiments shown in the drawing. The features to be taken from the description and the drawing may be employed in other embodiments of the present invention either singly or in any combination.

Figure 1:
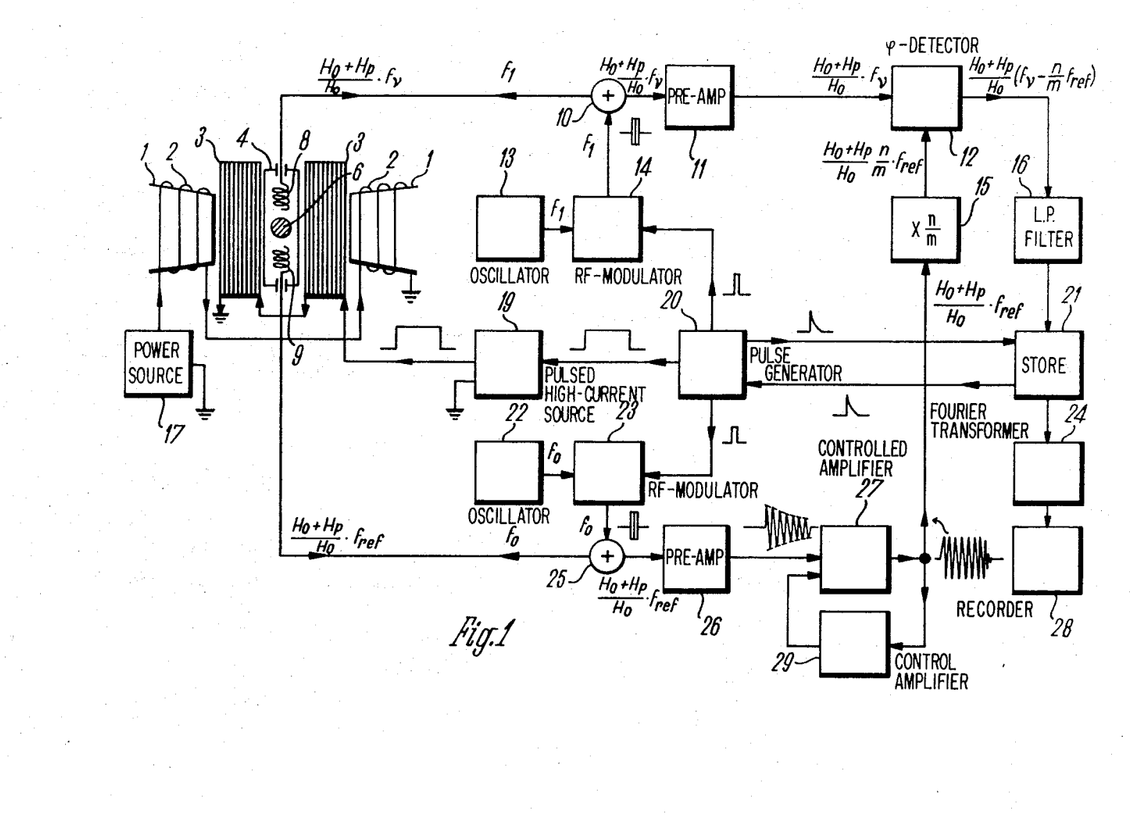
FIG. 1 is the block diagram of a first spin resonance spectrometer according to the invention.

The spin resonance spectrometer shown in FIG. 1 as an example of an embodiment of the present invention comprises a ferromagnet 1 with pole pieces carrying a copper winding 2 supplied by a power source 17. In the air gap of this magnet 1 there is an air-core coil 3 which is connected to an energy source 19 which supplies current pulses of a high current intensity and will be referred to as high-current source below. Moreover, in the air gap of the ferromagnet 1 and in the area of the magnetic field generated by the air-core coil 3 there is a shielded housing 4 called the sample head which contains the sample 6 and readiofrequency coils 8 and 9 whose axes are perpendicular to the magnetic field generated by the ferromagnet 1 and the air-core coil 3. The RF-coil 8 serves for excitation of the nuclear species of the sample 6 to be investigated, while the second RF-coil 9 is used for excitation of a different nuclear species supplying a reference frequency $f_{ref}$ which is very different from the signal frequency $f_v$ generated by the nuclei investigated. As a rule, the difference between these two frequencies is at least 5 percent so that a separation of these two frequencies is possible by means of the usual filters.

The RF-signals used for excitation of the two different nuclear species are generated by one oscillator 13 and 22, respectively, each. The frequencies $f_1$ and $f_0$, respectively, of the signals generated by these oscillators 13 and 22 roughly correspond to the Larmor frequency $f_\nu$ of the nuclear species to be investigated and the Larmor frequency $f_{ref}$, respectively, of the reference nucleus. The signals generated by the two oscillators 13 and 22 are subsequently modulated with a narrow pulse in one RF-modulator 14 and 23, respectively, each, which pulse is fed to the two modulators by a pulse generator 20. In this way, broadband high frequency pulses are generated which are supplied to the respective RF-coils 8 and 9 by the two RF-modulators 14 and 23 via one addition element each 10 and 25, respectively. The magnetic field $H_0$ generated by the ferromagnet 1 in its air gap is sufficiently strong to polarize the nuclei of the sample 6 contained in the air gap in an essentially complete way. These polarized nuclei are then excited by the RF-pulses supplied by means of the coils 8 and 9 which exhibit the broadband spectrum shown in line (b) of FIG. 2 due to the excitation. It is possible to rotate the vector of magnetization of all nuclei concerned by some 90 degrees through proper choice of the intensity and duration of the RF-pulses. After the end of the respective RF-pulse, the free precession oscillations of the nuclei will start which result in the induction of an RF-oscillation with the Larmor frequencies $f_\nu$ and $f_{ref}$ at the mangetic field $H_0$ of the ferromagnet in coils 8 and 9 by the precessing nuclei. However, immediately after the end of the excitation pulses the pulse generator 20 delivers a control pulse to the pulse high-current source 19, whereupon the high-current source supplies a high-current pulse to the air-core coil 3 of the spin resonance spectrometer with the result that the constant magnetic field $H_0$ of the ferromagnet is superimposed on a pulsed field $H_p$ of a high field strength acting in the same direction, as indicated in line (a) of FIG. 2. Therefore, the sample 6 is exposed to a magnetic field of measurement for the period of the high-current pulse which results from the superposition of the magnetic field of polarization $H_0$ and the pulsed magnetic field $H_p$ acting in the same direction. As a result, the Larmor frequencies of the free oscillations of precession increase by a factor of $(H_0 + H_p)/H_0$ for the duration of the pulse, as indicated in line (d) of FIG. 2. It should be pointed out that the Larmor frequencies obtained as a result of the application of the pulsed magnetic field are considerably higher than the Larmor frequencies at the strength $H_0$ of the magnetic field of polarization, which is indicated in lines (d) and (e) of FIG. 2 by the interruption of the frequency axis. The marked increase in the magnetic field, as mentioned above, results in a strong chemical shift which permits a separation of the two components on relatively broad lines.

The signals coupled out from the RF-coils 8 and 9 with the frequencies $(H_0 + H_p) f_\nu/H_0$ and $(H_0 + H_p) f_{ref}/H_0$, respectively, are fed to one selective preamplifier each, 11 and 26, respectively, through the corresponding addition elements 10 and 25, respectively. As a result of the selectivity of these amplifiers, the output of preamplifier 11 has only the nuclear signal to be investigated and the output of preamplifier 26 only the reference nuclear signal. Becuase of the relaxation of the nuclei, the intensity of the RF-signals coupled out by means of coils 8 and 9 decreases according to an e-function with time. Since the reference signal is to be used for superposition upon the nuclear signal under investigation and since this nuclear signal under investigation was to be registered as an interferogram, in its true intensity, the intensity of the reference signal should remain at least approximately constant for the period of the pulsed magnetic field. For this reason, the preamplifier 26 for the reference signal is followed by a series-connected controlled amplifier 27 for the referene signal with a corresponding control amplifier 29 whose output signal has a constant amplitude. Instead, it would be possible also to have the preamplifier 26 followed by a multistage amplitude limiter of the type employed, for instance, in high-grade FM receivers.

The output signal from the controlled amplifier 27 is then fed into a divider and multiplier stage 15 with the purpose of approximating the frequency of the reference signal as closely as possible to that of the interferogram signal. For this purpose, also a suitable frequency decade could be used whose base oscillator would be identical with the reference frequency or a subharmonic of the reference frequency. The modified reference signal generated by means of the divider and multiplier stage 15 is shown in line (e) of FIG. 2.

Figure 2:
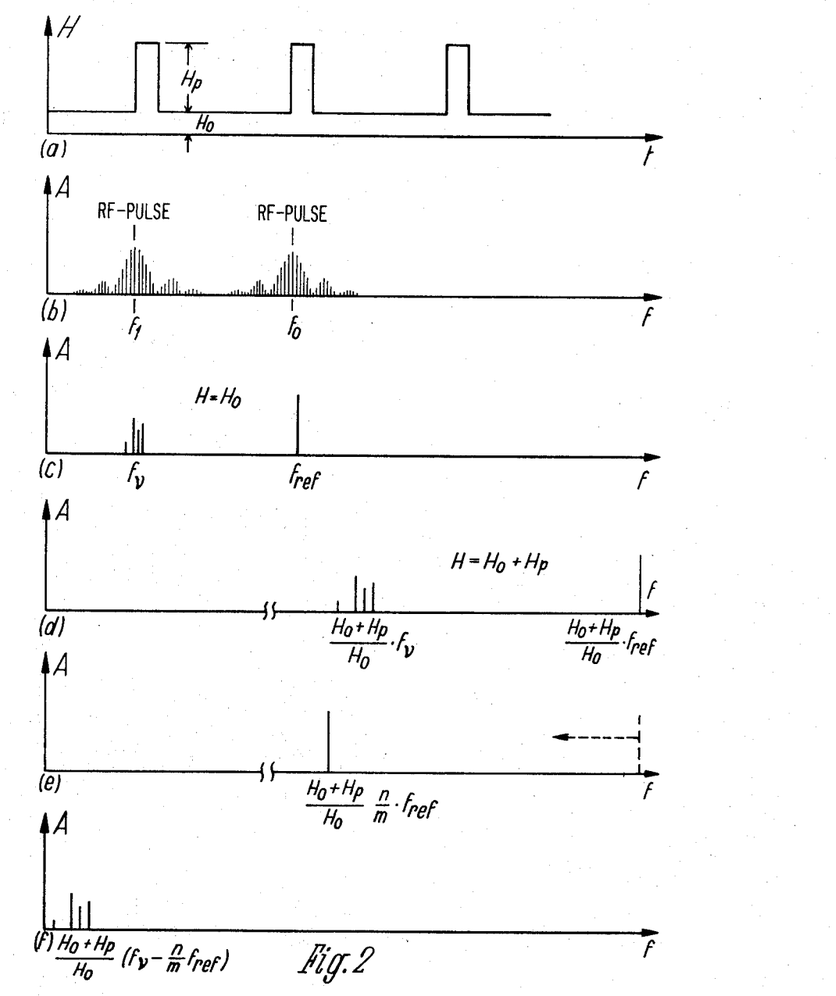
FIG. 2 is a diagram explaining the functioning of the spin resonance spectrometer as shown in FIG. 1.

The output signal supplied by the preamplifier 11 for the nuclear signal or interferogram signal to be investigated and the output signal from the divider and multiplier stage 15 are fed into a phase detector 12 in which these two signals are mixed. The output signal is a differential signal $(H_0 + H_p)(F_\nu - nf_{ref}/m)/H_0$. This difference signal is fed into a low pass filter 16 designed to suppress spurious signal components of a higher frequency. The low-frequency interferogram signal represented in line (f) of FIG. 2 is then supplied to a store 21. The number of storage locations required is a function of the highest frequency to be stored which, in turn, depends on the accuracy with which the frequency of the reference signal can be approximated to that of the interferogram signal by means of the divider and multiplier stage 15.

The beginning of storage is actuated by means of a control pulse supplied by the pulse generator 20 immediately upon the beginning of the current pulse supplied by the high-current source 19, i.e., immediately upon the beginning of the magnetic field pulse. As soon as the last address is covered in the store, the store supplies a stop pulse to the pulse generator 20 which causes the pulse generator to turn off the pulsed high-current source 19 and thus the pulsed magnetic field.

A Fourier transformer 24 is connected with the store 21 which analyzes the interferogram contained in the store 21 and determines the frequencies contained in the interferogram and the amplitudes assigned to the frequencies. The result of processing of the interferogram in the Fourier transformer 24 is plotted by means of a recorder 28 connected to the Fourier transformer.

If several interferograms are to be stored and averaged sequentially for improvement of the signal-to-noise ratio, the phase relationship between the interferogram signals and the reference signals should be the same after each excitation, if possible. This condition is fulfilled, for instance, if the frequencies of the oscillators 13 and 22 are multiples of a common base frequency $f_b$. For, in that case it holds that $f_1 = p \cdot f_B$ and $f_0 = q \cdot f_B$. In the relationships mentioned above, p and q should be integers.

If this condition is fulfilled, it is advantageous also if the $n/m$ ratio generated by means of the divider and multiplier stage 15 is identical with the $p/q$ ratio of the intergers mentioned above. However, instead, also the repetition frequency of the measurement events could be a subharmonic of the base frequency $f_B$.

Figure 3:
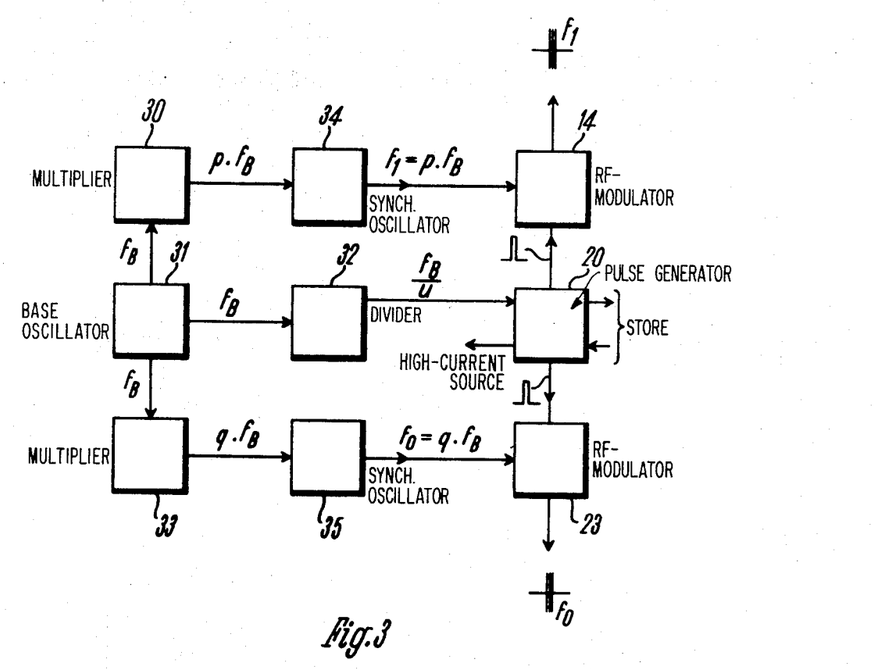
FIG. 3 is the block diagram of a modified version of the circuitry for generation of the RF-signal used for excitation of the samples.

FIG. 3 shows an arrangement for the generation of RF-pulses with the frequencies $f_1$ and $f_0$ which could replace the corresponding arrangement in the spin resonance spectrometer shown in FIG. 1, if repeated recording, storage and averaging of the interferogram signals is intended. This arrangement consists of a base oscillator 31 supplying a base frequency $f_B$ to two multipliers 30 and 33 and to a divider 32. The frequencies $pf_B$ and $qf_B$ generated at the outputs of the two multipliers 30 and 33 are used to synchronize one oscillator each, 34 and 35, respectively, each. The frequency $f_B/u$ present at the output of the divider 32 is used to excite the pulse generator 20 which feeds modulation pulses to the two RF-modulators 14 and 23 as a function of these excitation signals. As a consequence, the frequencies $f_1$ and $f_0$ in an arrangement like this are integral multiples of the common base frequency $f_B$, and the recurrence frequency of the measurement events, which is given by the repetition frequency of the modulation pulses supplied by the pulse generator 20, is an integral fraction $1/u$ or a subharmonic of the base frequency $f_B$, as required above.

Naturally, an arrangement similar to FIG. 3 can use also two frequency decades, instead of the two synchronized oscillators 34 and 35, which work with a common base oscillator.

Figure 4:
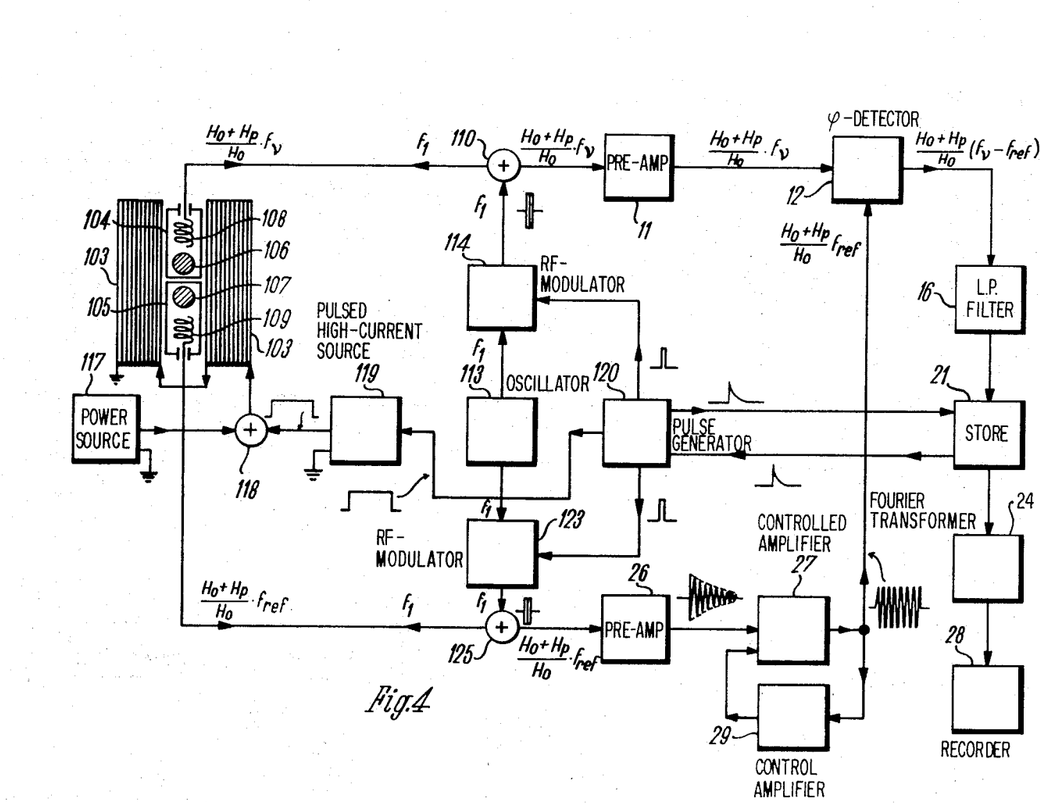
FIG. 4 is the block diagram of another spin resonance spectrometer according to the invention.

The embodiment of a spin resonance spectrometer shown in FIG. 4 has no ferromagnet for generation of a constant magnetic field of polarization but uses only an air-core coil 103. This air-core coil is supplied, on the one hand, by a power source 117 via an addition element 118, which power source supplies a continuous current for generation of the magnetic field of polarization and, at the same time, by a pulsed high-current source 119 which supplies high-current pulses for the generation of pulsed magnetic fields in the way outlined on the basis of FIG. 1, which fields act in the same direction as the constant magnetic field of polarization and, as a consequence, constitute the pulsed magnetic field of measurement together with this magnetic field of polarization.

Moreover, another difference in the design according to FIG. 4 relative to the design in accordance with FIG. 1 is the use, for generation of a reference frequency of the very nuclear species which is to be investigated. Since a separation by filters of the reference frequency from the signal frequency is no more possible, if the same nuclear species is used for measurement and for generation of the reference frequency, two samples 106 and 107 are used in this instance which are shielded relative to each other and are arranged in individual sample heads 104 and 105, respectively. Each of these two sample heads also contains an RF-coil 108 and 109, respectively.

The additional expenditure with respect to the sample heads due to the employment of the same nuclear species is set off by the requirement of only one excitation frequency $f_1$ which is supplied by the oscillator 113 in the embodiment shown. This oscillator 113 supplies the frequency $f_1$ to two modulators 114 and 123, respectively, to which a modulation signal is fed from a pulse generator 120 so as to produce RF-pulses which are supplied to the sample heads 104 and 105, respectively, by the addition elements 110 and 125, respectively, The rest of the design and the functioning of the spin resonance spectrometer as shown in FIG. 4 corresponds to the design and functioning of the embodiment shown in FIG. 1 except for the fact that the reference frequency does not have to be multiplied and/or divided in the phase detector 12 before being mixed with the signal frequency becuase, due to the use of the same nuclear species, the reference frequency is sufficiently close to the signal frequency to be suited for direct superposition.

Becuase of the agreement in design, the components not described in detail above in the design according to FIG. 4 have the same reference symbols as the components of the circuit arrangement as shown in FIG. 1 and reference is made to the respective description in this regard.

Figure 5:
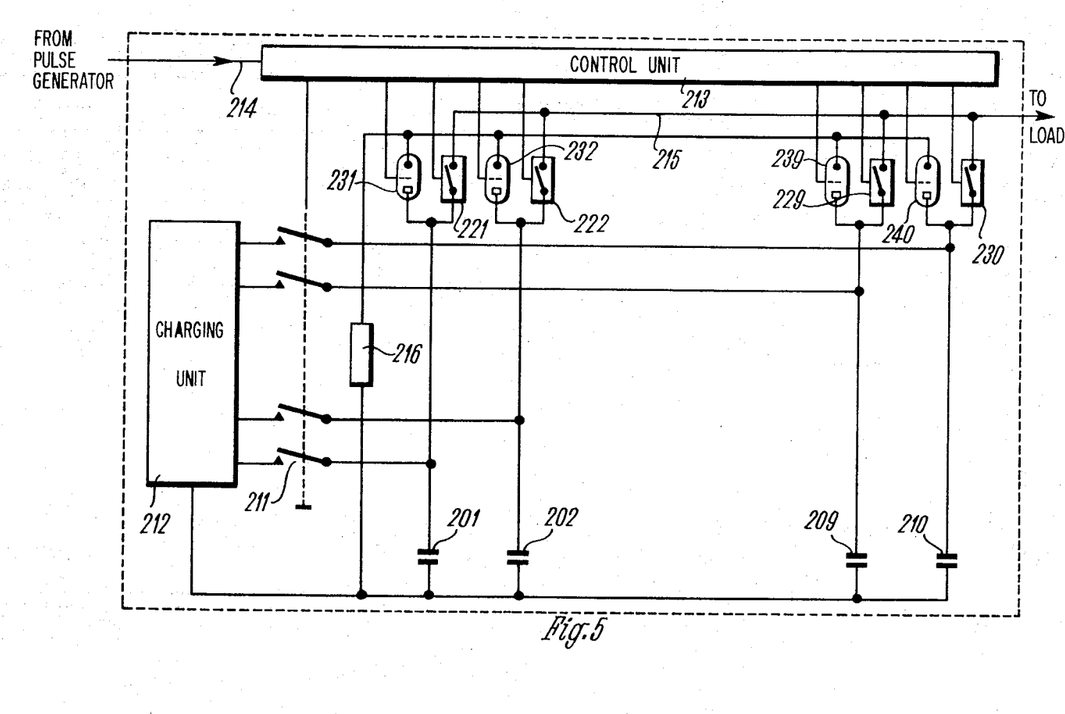
FIG. 5 is the block diagram of a high-current source suited for the spin resonance spectrometers in accordance with FIGS. 1 and 4.

FIG. 5 shows an embodiment of a pulsed high-current source of the type which can be used with the spin resonance spectrometers according to FIGS. 1 and 4. This pulsed high-current source consists of a bank of a total of ten capacitors 201, 202 . . . 209, 210 which can be connected by means of switches 211 to a charging unit 212 during the pulse intervals. The switches 211 are actuated jointly from a control unit 213 which, in turn, receives control signals through a line 214 from a pulse generator, espectially the pulse generator 20 and 120, respectively, of the spin resonance spectrometers shown. Depending upon the characteristics of the load connected to the high-current source, i.e., especially the air-core coil 3 and 103, respectively, and also the further design of the high-current source proper, all capacitors 201 to 210 can be charged to the same voltage or to different voltages. There is also the possibility of assigning different capacities to the capacitors 201 to 210.

Each of the capacitors 201 to 210 is connected with a line 215 leading to a load via a switch 221 and 222 . . . 229 or 230, respectively. These switches are closed during the pulse interval in a sequence determined by the control unit 213. The control unit 213 delivers the respective control signals to the switches 221 to 230. Although the switches 221 and 230 are represented as simple mechanical switches in the diagram, it is self-evident that such switches can be designed also as electronic switches, besides relays, and that thyristors are particularly suited as such switches. The proper choice of the capacitance of the capacitors 201 to 210 in connection with the choice of the charging voltage and the choice of the switching times makes it possible to keep constant the current flowing from the capacitors 201 to 210 through line 215 into the load, even taking into account the change in electrical characteristics the load undergoes as a result of current flowing through it, at least for a considerable part of the duration of the current pulse. Finer variations can be excluded by connecting a variable impedance parallel to the load connected to line 215. In the embodiment shown of a pulsed high-current source this load consists of the respective series connection of an impedance 216 which may have a complex resistance, and a variable resistance as a tube 231 and 232 . . . 239, respectively, connected in series with each of the capacitors 201 to 210 whose control orgains, i.e., especially its control grid, are connected with the control unit213. The control unit 213 thus controls the variable resistors 231 to 240 so as to reduce them from a practically infinitely large resistance value to a finite resistance value only after the respective switches 221 to 230 have been closed, and this finite resistance is changed in time so that the step-type changes in the current flowing to the load caused by the addition of the capacitors are accomodated and smoothed.

Naturally, the present invention is not limited to the embodiments shown but allows deviations from these without leaving the framework of the invention. Thus, for instance, in a spin resonance spectrometer according to the invention the air-core coil used to generate the pulsed magnetic field could be arranged within a cryomagnet instead of a ferromagnet. Moreover, the high-current source could be designed so that the current intensity is controlled as a function of signals which are derived from a control unit responding to the field strength of the pulsed magnetic field. This control unit could control especially the variable resistors formed by the tubes 231 to 240 or any other suitable controllable elements as a function of the field strength of the pulsed magnetic field in order to keep this magnetic field as constant as possible.

What we claim is:

1. A method of recording spin resonance spectra, specifically, nuclear spin resonance spectra, comprising, introducing a sample into a polarizing magnetic field which is at least approximately homogeneous, subsequently exciting said sample with an RF-pulse, then simultaneously registering all resonance frequencies of the sample as an interferogram and, finally, subjecting the interferogram to a Fourier analysis, characterized by the further step of applying a magnetic field of measurement with pulse-type excitation to said sample at the termination of excitation of the sample by said RF-pulse, the duration of which is essentially equal to the sum of the duration of the RF-pulse and the relaxation time of the excited spins.

2. A method as claimed in claim 1, characterized in that said polarizing magnetic field to which the sample is exposed is a continuous magnetic field of polarization of lower field strength in the intervals between the pulses of the magnetic field of measurement.

3. A method as claim in claim 2, characterized in that the sample is transferred from the area of the continuous magnetic field of polarization into the area of the pulsed magnetic field of measurement.

4. A method as claimed in claim 2, characterized in that the sample is exposed in the same place alternately to the continuous magnetic field of polarization and the pulsed field of measurement and the magnetic field of measurement is generated by superposition of the magnetic field of polarization by a pulsed magnetic field acting in the same direction.

5. A method as claimed in claim 2, characterized in that the sample is excited by the RF-pulse immediately before the pulsed magnetic field is turned on.

6. A method as claimed in claim 1, characterized in that the interferogram recorded is transformed into a lower frequency range by superposition with a reference frequency prior to performance of the Fourier analysis and the magnitude of this reference frequency is controlled as a function of the instantaneous field strength of the mangetic field of measurement.

7. A method as claimed in claim 6, characterized in that the reference frequency is controlled as a function of the field strength of the magnetic field of measurement in the way known from magnetic field stabilization as a function of the resonance frequency of standard samples which are exposed to the magnetic field of measurement.

8. A spin resonance spectrometer, specifically a nuclear spin resonance spectrometer, comprising generating means for generation of at least an approximately homogneous magnetic measuring field, means for introducing samples into this magnetic measuring field, means for excitation of samples with a pulsed RF-field, means for detecting the spin resonances excited in the sample, and means for registration and evaluation of the resonance frequencies of the detected spin resonances by Fourier analysis characterized in that said generating means includes an energy source supplying current pulses of high current intensity and an air-core coil for generation of an excited pulsed magnetic field aligned with said measuring field, which coil is connected to said energy source, and means for maintaining constant the current flow in the coil and thus the magnetic field generated by the coil for a considerable part of the duration of the pulse.

9. A spin resonance spectrometer as claimed in claim 8, characterized in that the means for keeping constant the current flow comprise several current sources, and including means for selectively connecting said current sources to said coil.

10. A spin resonance spectrometer as claimed in claim 9, characterized in that the energy source is designed as a capacitor bank whose capacitors forming the partial sources are charged to different voltages.

11. A spin resonance spectrometer as claimed in claim 8, characterized in that the means for keeping constant the current flow contain impedances that may be selectively disconnected.

12. A spin resonance spectrometer as claimed in claim 8, characterized in that the means for keeping constant the current flow contain control stages equipped with active circuit elements for control of the current intensity.

13. A spin resonance spectrometer as claimed in claim 8, characterized in that the means for keeping constant the current flow comprise a control unit responding to the field strength of the pulsed magnetic field.

14. A spin resonance spectrometer as claimed in claim 8, characterized in that the air-core coil is arranged in the gap of a ferromagnet.

15. A spin resonance spectrometer as claimed in claim 8, characterized in that the air-core coil is arranged in the magnetic field of a cryomagnet.

16. A spin resonance spectrometer as claimed in claim 8, characterized in that the device for registration and evaluation of the resonance frequencies comprises a generator for a reference frequency which is controlled by a resonance frequency of a standard sample contained in the magnetic field of measurement in such a way that the reference frequency is in a certain relation to the resonance frequency of the standard sample, and a superposition device in the form of a phase detector, in which the resonance frequencies recorded are superimposed the reference frequency for transformation into a lower frequency range.

* * * * *